United States Patent
Akazawa

[11] Patent Number: 5,971,622
[45] Date of Patent: Oct. 26, 1999

[54] DIVIDED TYPE ROLLING BEARING UNIT

[75] Inventor: Naohisa Akazawa, Kashiwara, Japan

[73] Assignee: Koyo Seiko Co., Ltd., Osaka, Japan

[21] Appl. No.: 09/064,087

[22] Filed: Apr. 22, 1998

[51] Int. Cl.$^6$ .............................. F16C 23/04; F16C 43/04; F16C 33/58

[52] U.S. Cl. ........................... 384/558; 384/570; 384/562

[58] Field of Search ..................... 384/558, 559, 384/570, 584, 585, 495, 498, 499, 510, 537, 906

[56] References Cited

U.S. PATENT DOCUMENTS

| | | | |
|---|---|---|---|
| 2,528,987 | 11/1950 | Ablett | 384/570 |
| 2,682,435 | 6/1954 | Rien et al. | 384/562 |
| 3,001,841 | 9/1961 | Glavan et al. | 384/562 |
| 5,287,623 | 2/1994 | Francis et al. | 384/570 |

*Primary Examiner*—Thomas R. Hannon
*Assistant Examiner*—Colby Hansen
*Attorney, Agent, or Firm*—Rabin & Champagne, P.C.

[57] ABSTRACT

A divided type aligning rolling bearing comprises a spherical groove of a lower bearing housing for slidably receiving an outer peripheral surface in a spherical shape of an outer ring lower member. A dowel pin is provided on the outer peripheral surface of the outer ring lower member and fitted in a recess provided on the bottom of the spherical groove of the lower bearing housing so as to have a backlash. The range of the backlash is an aligning range. The outer ring lower member is rotated around the dowel pin, thereby causing both ends of the outer ring lower member to escape from the spherical groove. In order to allow the escape, the lower bearing housing is in a non-rib shape. The outer ring lower member is brought into a detachable state by changing the posture thereof in a stable state.

6 Claims, 8 Drawing Sheets

DIVIDED TYPE ROLLING BEARING UNIT

BACKGROUND OF THE INVENTION

1. Field of the Invention

The present invention relates to a divided type rolling bearing unit of such a type that a raceway is divided along a shaft center.

2. Description of the Related Art

In this type of divided type rolling bearing unit, each of components such as an inner ring, an outer ring, and a bearing housing is divided into two parts along a shaft center such that it is easily attachable to or detachable from a shaft member or a neck portion of a roll.

In order to assemble the bearing in a guide roll or the like of continuous casting facilities of an iron mill, for example, which is the shaft member, the lower half of each of the divided components is assembled in the roll, the upper half of the component is then assembled, and the upper half and the lower half are integrated upon being tightened by a bolt.

When a high load at the time of casting is applied, the guide roll is deflected downward. Further, at the time of mounting the roll, a shaft center of the bearing integrally assembled may, in some cases, be shifted by a very small amount in a direction in which castings are fed (in the horizontal direction in this case). In such a case, the aligning characteristics of the bearing are important so as not to exert an excessive force on the bearing.

Conventionally in this type of divided type aligning rolling bearing unit, the outer ring is constituted by a semicircular upper member and a semicircular lower member, and the outer ring upper member is also used as an upper housing of the bearing housing. The outer ring lower member which receives a load is supported by a lower housing of the bearing housing. The outer ring lower member has its outer peripheral surface formed in a spherical shape in order to obtain an automatic aligning function. In order to regulate the aligning range of the outer ring lower member, both ends in the axial direction of the lower housing which receives the outer ring lower member are provided with ribs, and the ribs are used as stoppers upon being abutted against both end surfaces of the outer ring lower member.

If the ribs for regulating the aligning range thus exist on both sides of the outer ring lower member, a lower housing 91 must be rotated in its circumferential direction when an outer ring lower member 90 is detached from the lower housing 91 for the purpose of maintenance, as shown in FIG. 8. In this case, the posture of the outer ring lower member 90 is unstable because the outer ring lower member is likely to slide, so that work is very difficult.

SUMMARY OF THE INVENTION

An object of the present invention is to provide a divided type aligning rolling bearing unit to and from which a member composing the half of an outer ring can be easily attached and detached and is superior in maintainability.

In order to attain the above-mentioned object, a preferred mode of the present invention comprises an inner ring comprising first and second members in a semicircular shape which are connected to each other, an outer ring comprising first and second members in a semicircular shape which are connected to each other, a plurality of rolling members interposed between a raceway surface on the outer periphery of the inner ring and raceway surfaces on the inner periphery of the outer ring, and bearing housings for supporting the outer ring. The bearing housings comprise the first housing for receiving the first member in the outer ring and the second housing which is connected to the first housing so as to be detachable. The first member in the outer ring comprises an outer peripheral surface composed of a spherical surface, and the first housing comprises a spherical groove for slidably receiving the outer peripheral surface of the first member in the outer ring. A projection provided on either one of the bottom of the spherical groove and the outer peripheral surface of the first member in the outer ring is fitted in a recess provided in the other so as to have predetermined backlash. The first housing is in such a shape that the first member in the outer ring is rotated around the projection to allow both ends in the circumferential direction of the first member in the outer ring to escape from the spherical groove.

In the present embodiment, the first member in the outer ring is rotated relative to the first housing around the projection so that both the ends in the circumferential direction of the first member in the outer ring can escape from the spherical groove. That is, the first member in the outer ring can be brought into a detachable state by changing the posture of the first member in a stable state so that the maintenance work is easy. The first member in the outer ring is easy to detach, thereby improving the maintainability.

It is particularly preferable for a case where the bearing unit is applied to the support of a guide roll in facilities for continuous casting if the first and second members in the outer ring respectively comprise the outer ring lower member and the outer ring upper member and the first and second housings in the bearing housing respectively comprise the lower housing and the upper housing, The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Preferred embodiments of the present invention will be described while referring to accompanying drawings.

Figure 1:
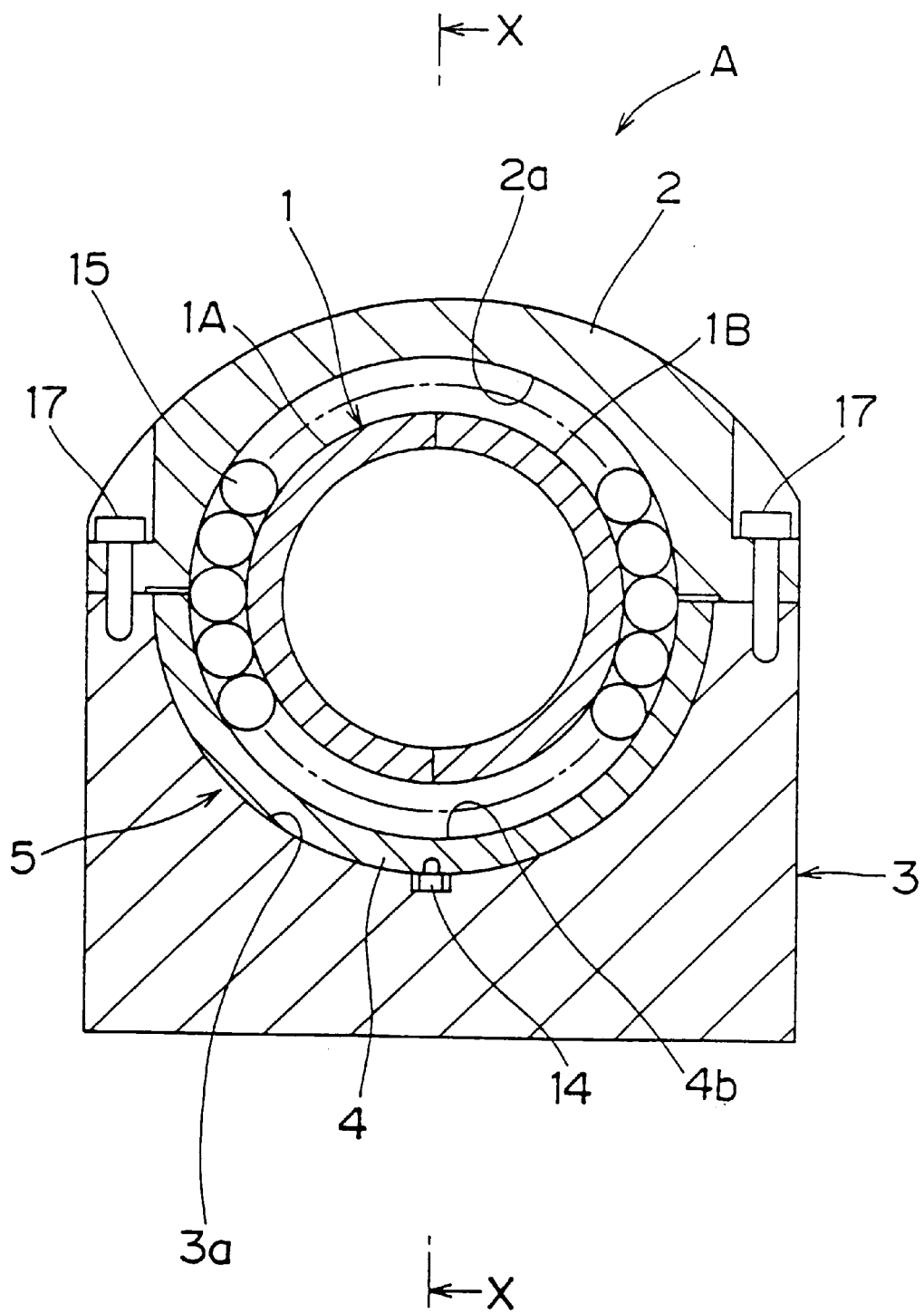
FIG. 1 is a front sectional view of a divided type rolling bearing unit according to one embodiment of the present invention.
Figure 2:
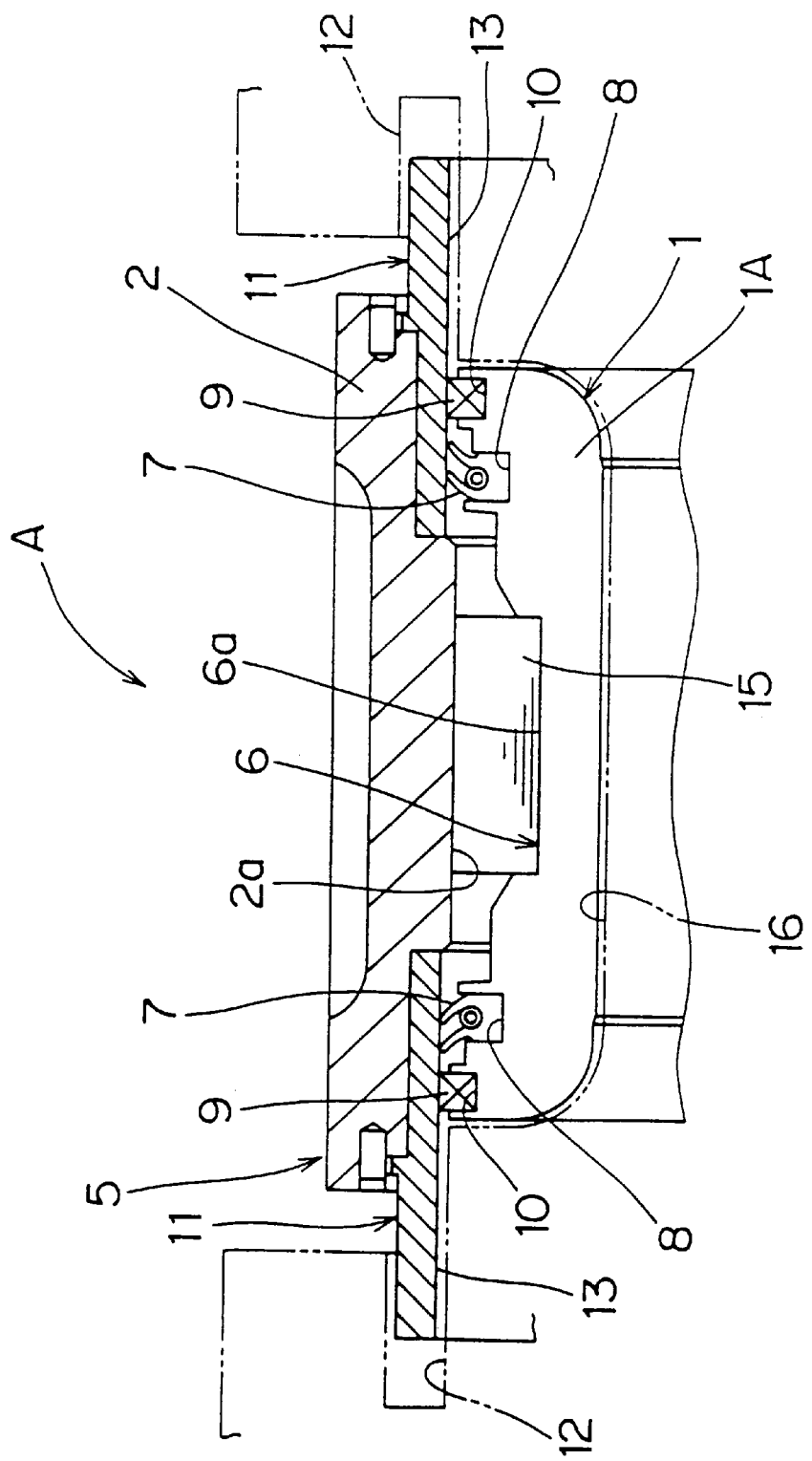
FIG. 2 is a cross-sectional view showing the upper half of the divided type rolling bearing unit which is cut along an X—X line shown in FIG. 1.
Figure 3:
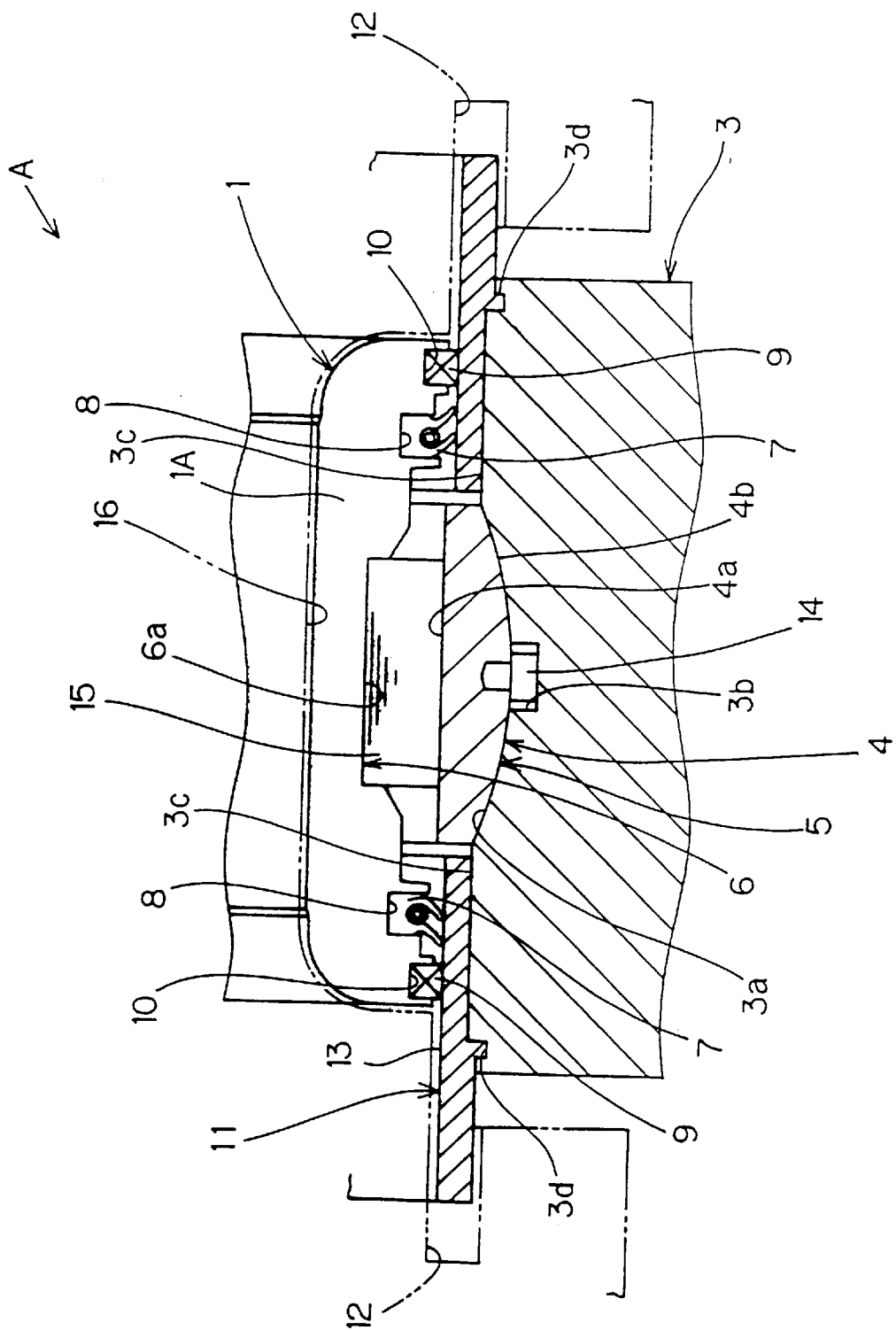
FIG. 3 is a cross-sectional view showing the lower half of the divided type rolling bearing unit which is cut along an X—X line shown in FIG. 1.

Referring to FIGS. 1, 2, and 3, in a divided type rolling bearing unit A, an upper bearing housing 2 also serving as an outer ring upper member and an outer ring lower member 4 in a semicircular shape supported by a lower bearing housing 3 are combined to constitute an outer ring 5. On the other hand, inner ring half members 1A and 1B being divided into two parts along the shaft center are combined to constitute an inner ring 1. A lot of cylindrical rollers 15 are interposed between respective raceway surfaces of the inner ring 1 and the outer ring 5. The inner ring 1 is fitted in a roll neck portion 16 made thinner than the other portion of a guide roll. The outer ring lower member 4 corresponds to a first member of the outer ring, and the outer ring upper member 2 corresponds to a second member of the outer ring. The lower bearing housing 3 corresponds to a first housing, and the upper bearing housing 2 corresponds to a second housing.

Referring to FIGS. 2 and 3, the inner ring 1 has an annular recess 6 formed in the center of its outer periphery, and a bottom surface of the annular recess 6 constitutes a raceway surface 6a. A pair of annular recesses 8 on which oil seals 7 serving as sealing members are to be respectively mounted is formed on both sides with the raceway surface 6a interposed therebetween in the axial direction, and a pair of annular recesses 10 on which packings 9 serving as sealing members are to be respectively mounted is further formed outside the annular recesses 8.

Labyrinth rings 11 each having ends are respectively fixed to both ends in the axial direction of each of the upper bearing housing 2 and the lower bearing housing 3. The labyrinth rings 11 are respectively inserted into recesses 12 formed on roll end surfaces with the roll neck portion 16 interposed therebetween to form a sealing structure in a labyrinth shape. On the other hand, an inner peripheral surface of each of the labyrinth rings 11 constitutes a sealing surface 13 which is brought into sliding contact with the oil seal 7 and the packing 9.

Referring to FIG. 3, a raceway surface 4a is formed on an inner peripheral surface of the outer ring lower member 4. An outer peripheral surface 4b of the outer ring lower member 4 is formed in a spherical shape and slidably fitted in a spherical groove 3a of the lower bearing housing 3. Reference numeral 14 denotes a dowel pin fixed to the outer peripheral surface of the outer ring lower member 4, which is contained in the recess 3b formed in the center of the bottom of the spherical groove 3a so as to have backlash. The range of the backlash is an aligning range.

Figure 4:
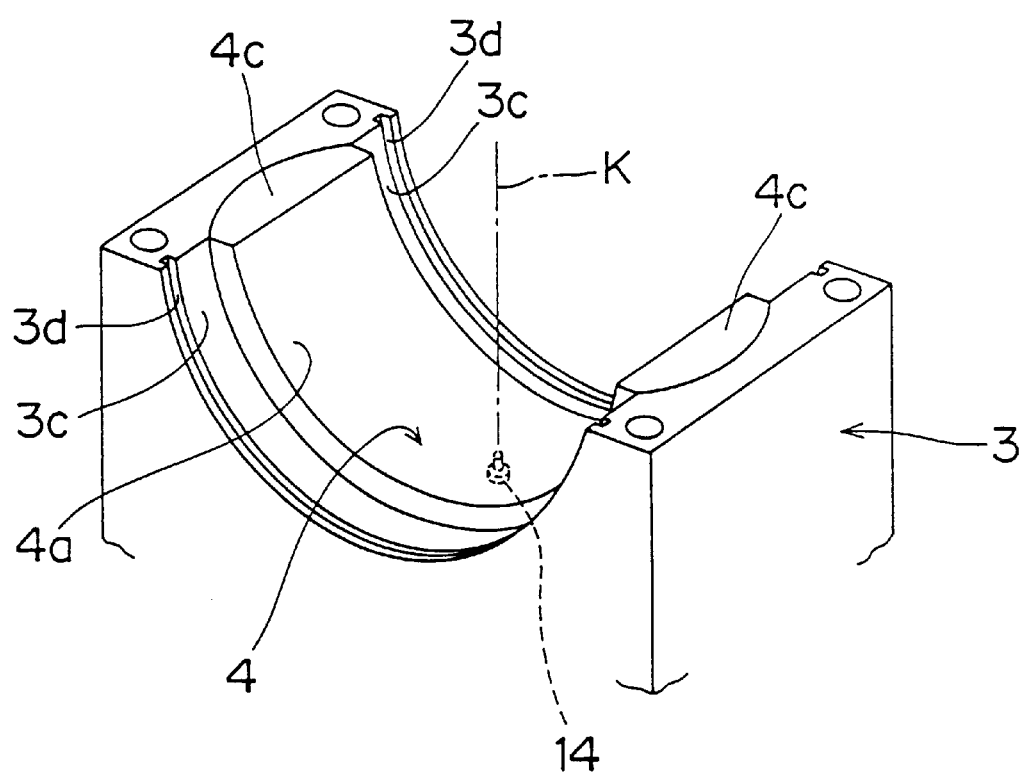
FIG. 4 is a perspective view of a lower housing on which an outer ring lower member is mounted.

Referring to FIG. 4 which is a perspective view of the outer ring lower member 4 and the lower bearing housing 3 and FIG. 3, peripheral grooves into which flanges of the labyrinth rings 11 are to be respectively inserted are formed in a pair of circular arc-shaped portions 3c with the spherical groove 3a of the lower bearing housing 3 interposed therebetween in the axial direction. However, a projecting portion such as a rib, for example, is not provided.

Figure 5:
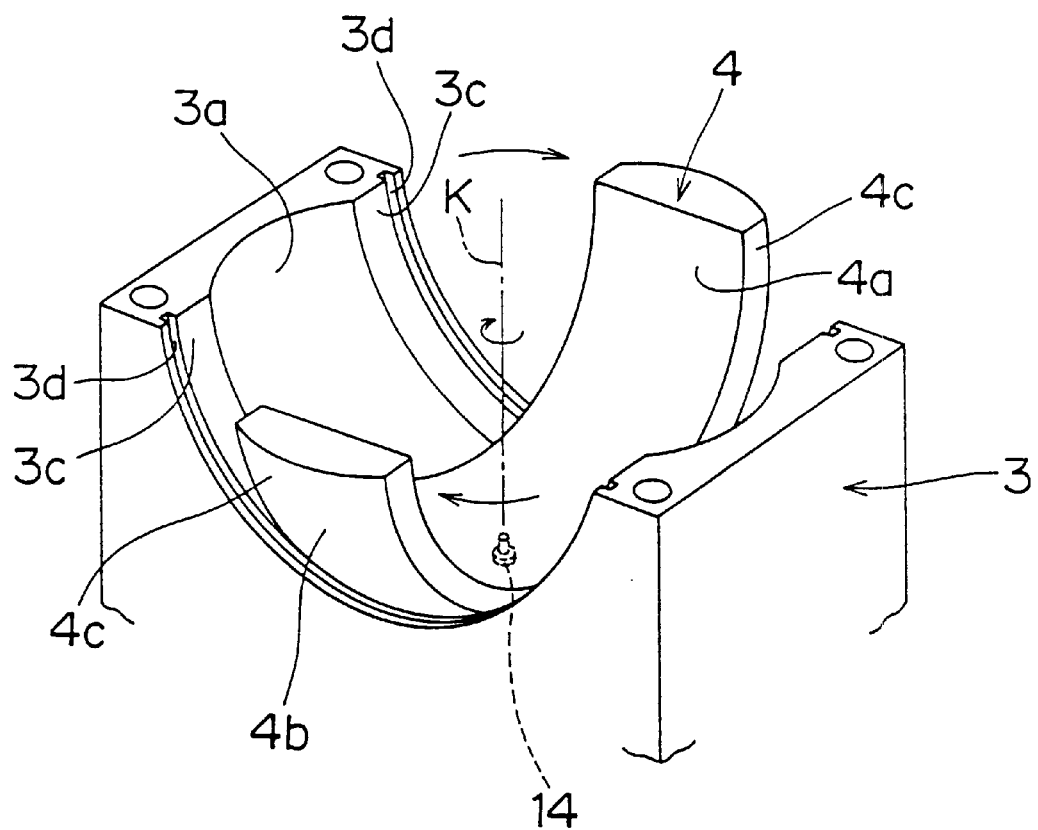
FIG. 5 is a schematic perspective view showing one process of detaching the outer ring lower member and a state where the outer ring lower member is rotated relative to the lower housing.
Figure 6:
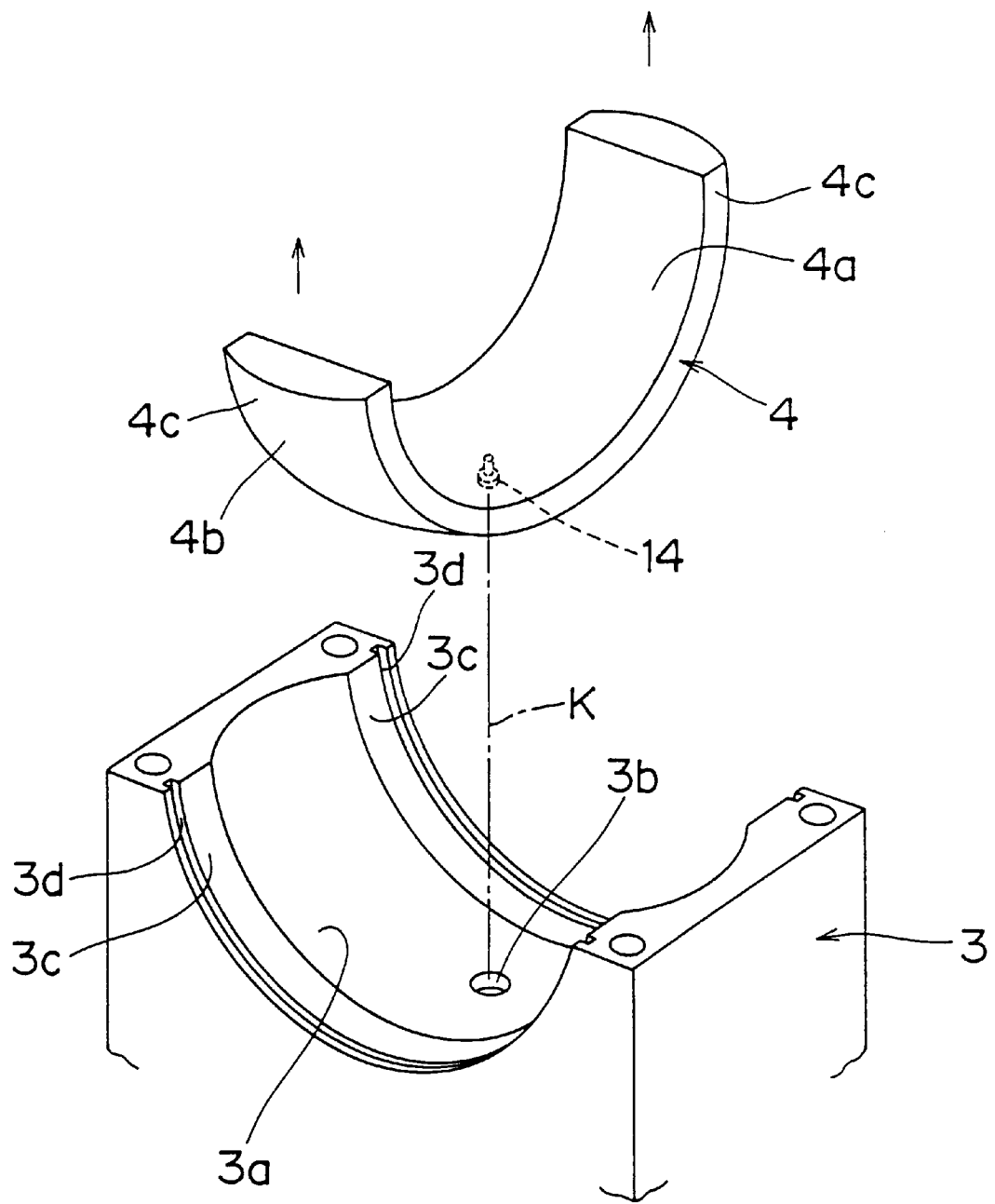
FIG. 6 is an exploded perspective view showing a state where the rotated outer ring lower member is detached from the lower housing.

Referring now to FIGS. 5 and 6, description is made of operations in a case where the outer ring lower member 4 is detached from the lower bearing housing 3 at the time of maintenance. From a state where the outer ring lower member 4 is mounted as shown in FIG. 4, the outer ring lower member 4 is rotated along the spherical groove 3a around the dowel pin 14 (around a vertical line K passing through the dowel pin 14). At this time, there is no projecting portion in the circular arc-shaped portions 3c of the lower bearing housing 3, so that the rotation of the outer ring lower member 4 is allowed. Both ends 4c in the circumferential direction of the outer ring lower member 4 escape from the spherical groove 3a as shown in FIG. 4 by the above-mentioned rotation. Therefore, the outer ring lower member 4 can be easily detached from the lower bearing housing 3 by raising both the ends 4c in the circumferential direction upward, as shown in FIG. 6.

In the present embodiment, the outer ring lower member 4 is rotated around the dowel pin 14, to change the posture of the outer ring lower member 4 in a stable state, causing both ends of the outer ring lower member 4 to escape from the spherical groove 3a, so that the outer ring lower member 4 can be brought into a detachable state. Consequently, the divided type rolling bearing unit of the present invention is superior in maintainability since the outer ring lower member 4 is detached easily as described above.

Figure 7:
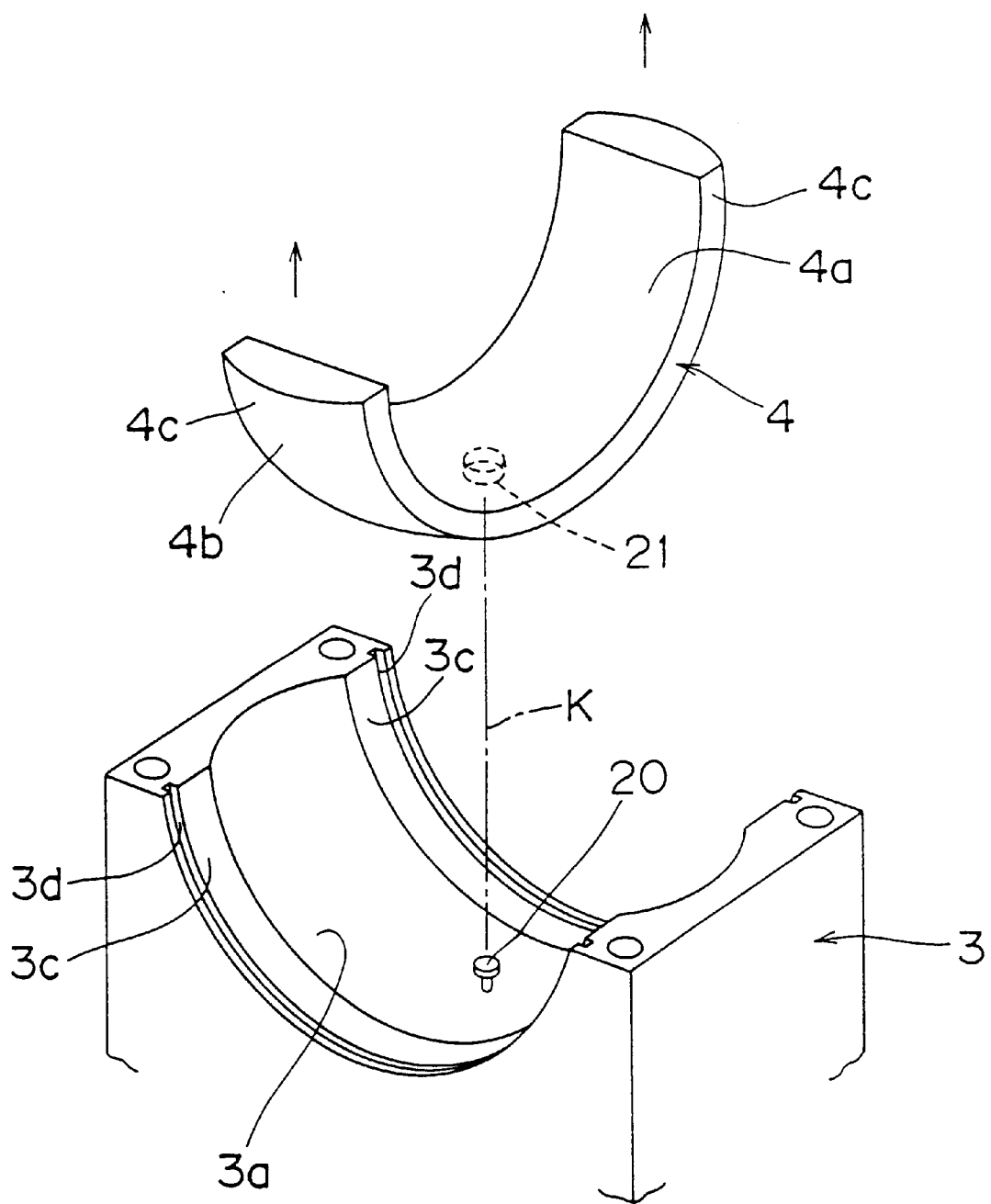
FIG. 7 is an exploded perspective view showing a state where an outer ring lower member in a divided type rolling bearing unit according to another embodiment of the present invention is detached from a lower housing.
Figure 8:
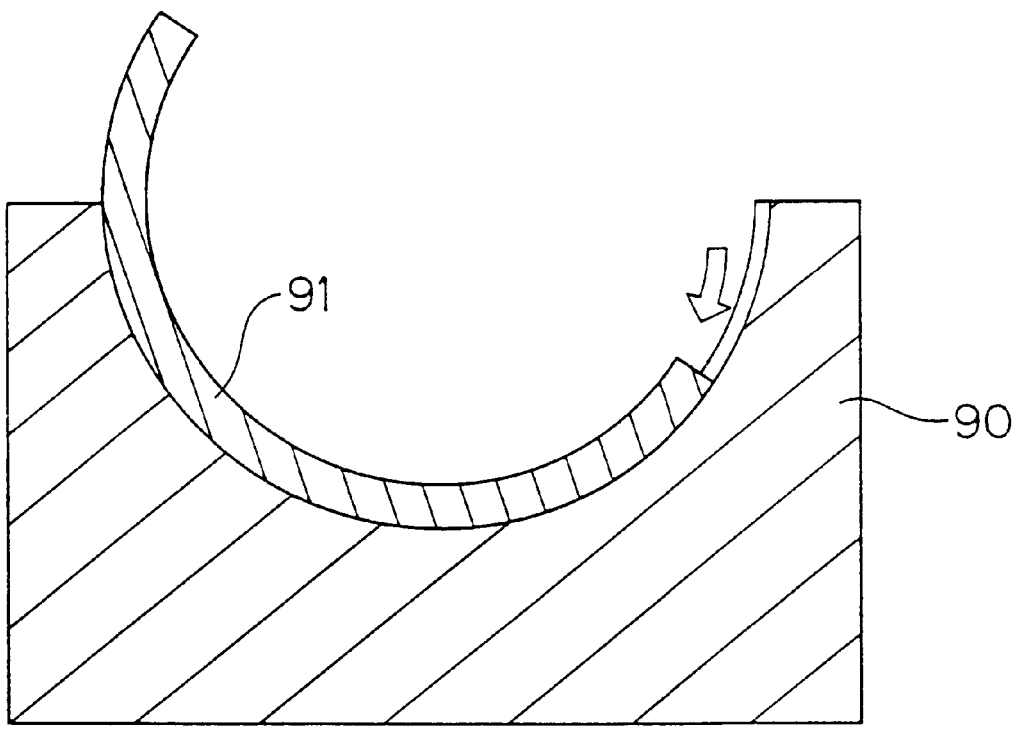
FIG. 8 is a schematic view showing the conventional step of detaching an outer ring lower member.

Although the dowel pin 14 is provided in the outer ring lower member 4 and a recess 3b is provided in the lower bearing housing 3 in the above-mentioned embodiment, a dowel pin 20 may be provided in a lower bearing housing 3 and a recess 21 may be provided in an outer ring lower member 4 as shown in FIG. 7.

Although in the above-mentioned embodiment, the outer ring upper member is also used as the upper bearing housing 2, the outer ring upper member and the upper bearing housing may be separately constructed.

In addition thereto, various changes can be made in the scope of the present invention.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A divided type aligning rolling bearing unit comprising:
    an inner ring including first and second members in a semicircular shape which are connected to each other;
    an outer ring including first and second members in a semicircular shape which are connected to each other;
    a plurality of rolling members interposed between a raceway surface on an outer periphery of the inner ring and raceway surfaces on an inner periphery of the outer ring; and
    bearing housings for supporting the outer ring, wherein the bearing housings include a first housing for receiving the first member in the outer ring and a second housing connected to the first housing so as to be detachable,
    the first member in the outer ring comprises an outer peripheral surface composed of a spherical surface,
    the first housing includes a spherical groove for slidably receiving the outer peripheral surface of the first member in the outer ring,
    a projection provided on either one of a bottom of the spherical groove or the outer peripheral surface of the first member in the outer ring is fitted in a recess provided on the other of the bottom of the spherical groove or the outer peripheral surface of the first member in the outer ring so as to have predetermined backlash,
    the first housing is in such a shape that the first member in the outer ring is rotated around the projection to allow both ends in a circumferential direction of the first member in the outer ring to escape from the spherical groove.

2. The divided type aligning rolling bearing unit according to claim 1, wherein the first housing includes a pair of circular arc-shaped portions with the spherical groove interposed therebetween in an axial direction, the circular arc-shaped portions avoiding interference with a virtual spherical surface including an inner surface of the spherical groove.

3. The divided type aligning rolling bearing unit according to claim 1, wherein the first housing is of a non-rib type.

4. The divided type aligning rolling bearing unit according to claim 1, wherein the projection includes a dowel pin fixed to either one of a bottom of the spherical groove or the outer peripheral surface of the first member in the outer ring.

5. The divided type rolling bearing unit according to claim 1, wherein the first and second members in the outer ring respectively include an outer ring lower member and an outer ring upper member, the first and second housings in the bearing housing respectively include a lower housing and an upper housing.

6. The divided type aligning rolling bearing unit according to claim 5, wherein the outer ring upper member is formed integrally with the upper housing.

* * * * *